US008962139B2

(12) United States Patent
Zenitani et al.

(10) Patent No.: US 8,962,139 B2

(45) **Date of Patent: *Feb. 24, 2015**

(54) RESIN PARTICLE AND METHOD FOR PRODUCING THE SAME

(75) Inventors: Yuka Zenitani, Kanagawa (JP); Hideaki Yoshikawa, Kanagawa (JP); Hiroyoshi Okuno, Kanagawa (JP); Shunsuke Nozaki, Kanagawa (JP); Shinichiro Kawashima, Kanagawa (JP); Sakae Takeuchi, Kanagawa (JP); Yasuo Kadokura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 136 days.

This patent is subject to a terminal disclaimer.

(21) Appl. No.: 13/214,657

(22) Filed: Aug. 22, 2011

(65) Prior Publication Data

US 2012/0189851 A1 Jul. 26, 2012

(30) Foreign Application Priority Data

Jan. 20, 2011 (JP) ................................ 2011-010052

(51) Int. Cl.

| | |
|---|---|
| ***B32B 15/02*** | (2006.01) |
| ***B05D 1/36*** | (2006.01) |
| ***B05D 5/00*** | (2006.01) |
| ***B05D 7/00*** | (2006.01) |
| ***G03G 9/097*** | (2006.01) |
| ***G03G 9/08*** | (2006.01) |

(52) U.S. Cl.

CPC .......... *G03G 9/09725* (2013.01); *G03G 9/0812* (2013.01); *G03G 9/09716* (2013.01)

USPC ............................ 428/403; 428/402; 423/335

(58) Field of Classification Search

None

See application file for complete search history.

(56) References Cited

U.S. PATENT DOCUMENTS

| | | | | |
|---|---|---|---|---|
| 4,775,520 | A | 10/1988 | Unger et al. | |
| 4,849,390 | A | 7/1989 | Sano et al. | |
| 4,902,598 | A | 2/1990 | Winnik et al. | |
| 4,911,903 | A | 3/1990 | Unger et al. | |
| 5,221,497 | A | 6/1993 | Watanabe et al. | |
| 5,597,512 | A | 1/1997 | Watanabe et al. | |
| 5,609,675 | A | 3/1997 | Noritake et al. | |
| 5,674,589 | A | 10/1997 | Bennett et al. | |
| 5,985,229 | A | 11/1999 | Yamada et al. | |
| 5,998,329 | A | 12/1999 | Derolf et al. | |
| 6,113,682 | A | 9/2000 | Shin et al. | |
| 6,403,271 | B1 | 6/2002 | Suzuki et al. | |
| 6,770,130 | B2 | 8/2004 | Kato et al. | |
| 6,811,944 | B2 * | 11/2004 | Higuchi et al. | 430/124.1 |
| 6,875,549 | B2 | 4/2005 | Yamazaki et al. | |
| 7,846,632 | B2 | 12/2010 | Nakatani | |
| 2004/0067189 | A1 | 4/2004 | Sugiura et al. | |
| 2004/0137353 | A1 | 7/2004 | Iida et al. | |
| 2004/0222618 | A1 | 11/2004 | Azechi et al. | |
| 2004/0229040 | A1 | 11/2004 | Kudo et al. | |
| 2005/0260515 | A1 | 11/2005 | Kato et al. | |
| 2007/0020543 | A1 | 1/2007 | Nakatani | |
| 2007/0218387 | A1 | 9/2007 | Ishii et al. | |
| 2008/0086951 | A1 | 4/2008 | Wakamiya et al. | |
| 2008/0268362 | A1 | 10/2008 | Kudo | |
| 2010/0203443 | A1 | 8/2010 | Okita et al. | |
| 2010/0330488 | A1 | 12/2010 | Ieda | |
| 2011/0209413 | A1 | 9/2011 | Nishida et al. | |
| 2011/0318584 | A1 | 12/2011 | Yoshikawa et al. | |
| 2011/0319647 | A1 | 12/2011 | Yoshikawa et al. | |

FOREIGN PATENT DOCUMENTS

| | | | |
|---|---|---|---|
| CN | 86106689 | A | 5/1987 |
| CN | 1380585 | A | 11/2002 |
| CN | 101271287 | A | 9/2008 |
| EP | 0 574 642 | A1 | 12/1993 |
| JP | A-62-52119 | | 3/1987 |
| JP | A-63-310714 | | 12/1988 |
| JP | A 1-317115 | | 12/1989 |
| JP | A-1-317115 | | 12/1989 |
| JP | A-4-187512 | | 7/1992 |
| JP | A-4-238807 | | 8/1992 |
| JP | A-04-255755 | | 9/1992 |
| JP | A-5-4812 | | 1/1993 |
| JP | A-06-041419 | | 2/1994 |
| JP | A-6-254383 | | 9/1994 |
| JP | A-7-118008 | | 5/1995 |
| JP | A 7-118008 | | 5/1995 |
| JP | A-7-277725 | | 10/1995 |
| JP | A-8-12305 | | 1/1996 |
| JP | A-08-283617 | | 10/1996 |
| JP | A-09-143401 | | 6/1997 |

(Continued)

OTHER PUBLICATIONS

Sep. 17, 2012 Office Action issued in U.S. Appl. No. 12/917,814.
U.S. Appl. No. 12/912,057 in the name of Zenitani et al. filed Oct. 26, 2010.
U.S. Appl. No. 12/917,814 in the name of Yoshikawa et al. filed Nov. 2, 2010.
Mar. 14, 2013 Office Action issued in U.S. Appl. No. 12/912,057.
Mar. 20, 2013 Office Action issued in U.S. Appl. No. 12/917,814.
Apr. 12, 2012 Extended European Search Report issued in European Patent Application No. 11185668.8.
U.S. Appl. No. 13/214,816, filed Aug. 22, 2011 in the name of Hideaki Yoshikawa et al.
Sep. 10, 2012 Office Action issued in Australian Patent Application No. 2011232772.
Oct. 23, 2012 Office Action issued in U.S. Appl. No. 12/912,057.

(Continued)

*Primary Examiner* — Alicia Chevalier
*Assistant Examiner* — Alexandre Ferre
(74) *Attorney, Agent, or Firm* — Oliff PLC

(57) ABSTRACT

A resin particle including: a resin mother particle; and silica particles externally added onto a surface of the resin mother particle, wherein primary particles of the silica particles, the primary particles which have a volume average particle diameter of from 80 nm to 300 nm, a particle size distribution index of from 1.10 to 1.40, an average circularity of from 0.70 to 0.92 and an average circularity distribution index of from 1.05 to 1.50, and a proportion of the primary particles having an average circularity of 0.95 or more is not more 10% by number.

16 Claims, No Drawings

(56) References Cited

FOREIGN PATENT DOCUMENTS

| | | |
|---|---|---|
| JP | A-9-202612 | 8/1997 |
| JP | A 11-060232 | 3/1999 |
| JP | A-11-060232 | 3/1999 |
| JP | A-11-286611 | 10/1999 |
| JP | A-2000-344512 | 12/2000 |
| JP | A-2001-150334 | 6/2001 |
| JP | A-2001-189009 | 7/2001 |
| JP | A-2002-38049 | 2/2002 |
| JP | A-2002-038049 | 2/2002 |
| JP | A-2002-146233 | 5/2002 |
| JP | A 2003-133267 | 5/2003 |
| JP | A-2003-133267 | 5/2003 |
| JP | A-2003-165718 | 6/2003 |
| JP | A-2003-171117 | 6/2003 |
| JP | A-2004-035293 | 2/2004 |
| JP | A 2004-035293 | 2/2004 |
| JP | A-2004-102236 | 4/2004 |
| JP | A 2004-203638 | 7/2004 |
| JP | A-2004-203638 | 7/2004 |
| JP | A-2004-338969 | 12/2004 |
| JP | A-2005-84295 | 3/2005 |
| JP | A-2006-028319 | 2/2006 |
| JP | A-2006-251220 | 9/2006 |
| JP | A-2007-22827 | 2/2007 |
| JP | A 2008-169102 | 7/2008 |
| JP | A-2008-169102 | 7/2008 |
| JP | A-2008-174430 | 7/2008 |
| JP | A-2008-285406 | 11/2008 |
| JP | A-2009-078935 | 4/2009 |
| JP | A 2009-078935 | 4/2009 |
| JP | A 2009-137791 | 6/2009 |
| JP | A-2009-137791 | 6/2009 |
| JP | A-2009-149493 | 7/2009 |
| JP | A 2009-149493 | 7/2009 |
| JP | A-2009-161371 | 7/2009 |
| JP | A 2009-161371 | 7/2009 |
| JP | A-2011-185998 | 9/2011 |
| JP | A-2012-6781 | 1/2012 |
| JP | A-2012-6789 | 1/2012 |
| WO | WO 2008/018966 A2 | 2/2008 |
| WO | WO 2010/052945 A1 | 5/2010 |

OTHER PUBLICATIONS

Aug. 16, 2013 Office Action issued in U.S. Appl. No. 13/214,816.

Oct. 15, 2013 Office Action issued in Japanese Application No. 2010-143828 (with English Translation).

Kim et al., "Influence of reaction conditions on sol-precipitation process producing silicon oxide particles," Ceramics International, vol. 28 (2002), pp. 187-194.

Wang et al., "Preparation of spherical silica particles by Stöber process with high concentration of tetra-ethyl-orthosilicate," Journal of Colloid and Interface Science, vol. 341, pp. 23-29, available online Sep. 18, 2009.

Nagao et al., "Particle formation in the hydrolysis of tetraethyl orthosilicate in pH buffer solution," Journal of Colloid and Interface Science, vol. 279 (2004), pp. 143-149.

Jan. 30, 2014 Office Action issued in U.S. Appl. No. 13/214,816.

Dec. 19, 2013 Office Action issued in Chinese Application No. 201010546805.8 (with English Translation).

Jul. 22, 2013 Office Action issued in Australian Patent Application No. 2012258292.

U.S. Appl. No. 13/934,928 in the name of Iwanaga et al., filed Jul. 3, 2013.

U.S. Appl. No. 13/670,040 in the name of Iwanaga et al., filed Nov. 6, 2012.

May 7, 2014 Office Action issued in U.S. Appl. No. 12/917,814.

May 23, 2014 Notice of Allowance issued in U.S. Appl. No. 12/912,057.

Mar. 21, 2014 Office Action issued in U.S. Appl. No. 13/670,040.

Japanese Patent Office, Notice of Reasons for Rejection mailed Oct. 29, 2013 in Japanese Patent Application No. 2010-145221 w/English-language Translation.

Aug. 20, 2014 Office Action issued in Chinese Application No. 201010546805.8 (with English Translation).

Aug. 28, 2014 Office Action issued in U.S. Appl. No. 13/670,040.

Other Document 1: Table to confirm that the oxide particles described in [Table 1] of [0265] of Publication 1 satisfy the formula (I) of Claim 1 of the present application (with English Translation).

Jul. 7, 2014 Information Offer Form issued in Japanese Application No. 2011-008842 (with English Translation).

Dec. 5, 2014 Office Action issued in U.S. Appl. No. 12/917,814.

* cited by examiner

RESIN PARTICLE AND METHOD FOR PRODUCING THE SAME

CROSS-REFERENCE TO RELATED APPLICATION(S)

The present application claims priority from Japanese Patent Application No. 2011-010052 filed on Jan. 20, 2011, the entire content of which is incorporated herein by reference.

BACKGROUND

1. Field

The present invention relates to a resin particle and a method for producing the same.

2. Description of the Related Art

Resin particles are used for toners, powder coating materials, binders of slush molding materials and the like. Here, for example, in order to enhance strength of the resin or fluidity of the powder or to suppress packing, there may be the case where it is contrive to allow silica particles to attach to a resin particle, thereby functionalizing the resin particle. It may be considered that such a function is easy to depend upon the shape or attached state of the silica particles as an external additive of the rein particle, and silica particles having various shapes and attached modes are proposed.

SUMMARY (1) A resin particle including: a resin mother particle; and silica particles externally added onto a surface of the resin mother particle, wherein primary particles of the silica particles, the primary particles which have a volume average particle diameter of from 80 nm to 300 nm, a particle size distribution index of from 1.10 to 1.40, an average circularity of from 0.70 to 0.92 and an average circularity distribution index of from 1.05 to 1.50, and a proportion of the primary particles having an average circularity of 0.95 or more is not more 10% by number.

DETAILED DESCRIPTION OF EXEMPLARY EMBODIMENTS

A resin particle of the present invention includes a resin mother particle; and silica particles externally added onto the surface of the resin mother particle, the silica particles being the silica particles which contain primary particles having a volume average particle diameter of from 80 nm to 300 nm, a particle size distribution index of from 1.10 to 1.40, an average circularity of from 0.70 to 0.92 and an average circularity distribution index of from 1.05 to 1.50, in which a proportion of the primary particles having an average circularity of 0.95 or more is not more 10% by number.

The silica particles having the foregoing constitution, which is externally added onto the surface of the resin mother particle, is also referred to as "specified silica particles". Also, when the "primary particles" is simply referred to, it means primary particles of the specified silica particles.

For example, in applications such as a toner and a powder coating material, the resin particle is blended into a coloring material and used as a binder resin while utilizing stickiness which a melted resin has. Also, the resin particle is used for an application of so-called slush molding (also called "powder slush molding") in which a resin particle is cast into a heated molding die to achieve melt molding.

Here, when the resin particle becomes sticky before it is melted, there may be the case where the resin particle is tacky to cause aggregation (also called "blocking"). However, by forming the resin particle according to the first exemplary embodiment into a resin particle in which the specified silica particles are externally added onto the surface of the resin mother particle, there may be realized a resin particle in which the above-described tackiness of the resin particle is suppressed, and deterioration of aggregation resistance is suppressed.

While a reason why the resin particle according to the first exemplary embodiment suppresses the deterioration of aggregation resistance is not elucidated yet, it may be considered that this is caused due to the following reason. Incidentally, the "resin mother particle" as referred to herein means a resin particle to which the specified silica particles do not attach among resin particles.

It may be considered that in view of the fact that the specified silica particles are uniform in the particle size distribution in specified particles diameter range, adhesion of particles to each other is smaller than that of a group of particles having a wide particle size distribution, and therefore, friction among the particles is hardly caused. As a result, it may be considered that excellent fluidity is revealed. Furthermore, in view of the fact that the specified silica particles are a heterogeneous particle which has a low circularity and a relatively narrow circularity distribution and in which a proportion of primary particles having an average circularity of 0.95 or more is not more than 10% by number, it may be considered that the specified silica particles are different from a spherical particle and furthermore, is small in adhesion of particles to each other. In addition to the above, it may be conjectured that the specified silica particles are excellent in attachment properties to the resin mother particle and dispersibility.

In consequence, since the specified silica particles are externally added onto the surface of the resin mother particle and are hardly liberated, it may be conjectured that the surface of the resin mother particle is coated over the specified silica particles, and the surface of the resin mother particle is hardly exposed. According to this, even if the resin mother particle has tackiness, the surface of the resin mother particle is coated over the specified silica particles externally added onto the surface of the resin mother particle, and therefore, the stickiness of the resin particle may be suppressed.

As a result, it may be considered that the resin particle according the first exemplary embodiment is excellent in controllability against the deterioration of aggregation resistance.

The resin particle according to the first exemplary embodiment is hereinafter described in detail.

First of all, the silica particles which are externally added onto the surface of the resin mother particle are described.

[Silica Particles (Specified Silica Particles)]

The silica particles (specified silica particles) which are externally added onto the surface of the resin mother particle contains primary particles having a volume average particle diameter of from 80 nm to 300 nm, a particle size distribution index of from 1.10 to 1.40, an average circularity of from 0.70 to 0.92 and an average circularity distribution index of from 1.05 to 1.50, in which a proportion of primary particles having an average circularity of 0.95 or more is not more 10% by number.

Physical properties of the specific silica particles are successively described.

—Volume Average Particle Diameter—

In the specified silica particles, a volume average particle diameter of the primary particles is from 80 nm to 300 nm.

When the volume average particle diameter of the primary particles is less than 80 nm, the shape of the particle is easy to become spherical, so that it is difficult to form a shape having an average circularity of from 0.70 to 0.92. When the volume average particle diameter of the primary particles exceeds 300 nm, in the case where the silica particles are allowed to be externally added onto the surface of the resin mother particle, the strength of the resin particle is hardly enhanced, and the fluidity of the resin particle is hardly enhanced.

The volume average particle diameter of the primary particles is desirably from 90 nm to 250 nm, and more desirably from 100 nm to 200 nm.

The volume average particle diameter of the primary particles is measured using an LS Coulter (particle size analyzer, manufactured by Beckman Coulter, Inc.). With respect to the particle size distribution of the measured particles, a cumulative distribution regarding the volume of each of the particles relative to the divided particle size range (channel) is drawn from the small diameter side, and a particle diameter at an accumulation of 50% is defined as a volume average particle diameter ($D_{50v}$).

—Particle Size Distribution Index—

In the specified silica particles, a particle size distribution index of the primary particles is from 1.10 to 1.40.

It is difficult to produce silica particles having a particle size distribution index of the primary particles of less than 1.10. What the particle size distribution index of the primary particles exceeds 1.40 is not desirable because coarse particles are generated, or dispersibility into the surface of the resin mother particle is deteriorated due to scattering of the particle diameter.

The particle size distribution index of the primary particles is desirably from 1.10 to 1.25.

The particle size distribution index of the primary particles is measured using an LS Coulter (particle size analyzer, manufactured by Beckman Coulter, Inc.). With respect to the particle size distribution of the measured particles, a cumulative distribution regarding the volume of each of the particles relative to the divided particle size range (channel) is drawn from the small diameter side, and a square root of a value obtained by dividing a particle diameter $D_{84v}$ at an accumulation of 84% by a particle diameter $D_{16v}$ at an accumulation of 16% is defined as a particle size distribution index ($GSD_v$). That is, the particle size distribution index ($GSD_v$) is $(D_{84v}/D_{16v})^{0.5}$.

—Average Circularity—

In the specified silica particles, an average circularity of the primary particles is from 0.70 to 0.92.

When the average circularity of the primary particles exceeds 0.92, the primary particles become spherical, whereby it may have the same characteristics as in a spherical silica particle; and therefore, at the time of allowing the silica particles to be externally added onto the surface of the resin mother particle, mixing properties or attachment properties onto the surface of the resin mother particle are poor, and the resulting particle is weak against a mechanical load and easy to impair fluidity. For that reason, for example, in the case of mixing the silica particles and the resin mother particle and stirring the mixture, or after storage with time, the silica particles may possibly unevenly attach onto the surface of the resin mother particle or may possibly reversely detach from the resin particle. When the average circularity of the primary particles is less than 0.70, the resulting particle has a shape of a large aspect ratio, and in the case where a mechanical load is applied to the silica particles, stress concentration is caused, so that the resulting particle is easily broken. Also, it is difficult to produce primary particles having an average circularity of less than 0.70 by a sol-gel method.

The average circularity of the primary particles is desirably from 0.72 to 0.85.

Incidentally, the circularity of the primary particles is obtained as "100/SF2" which is calculated according to the following expression (1) by observing primary particles after dispersing the specified silica particles in the resin mother particle having a volume average particle diameter of 100 μm (for example, a polyester resin having a weight average molecular weight Mw of 50,000) by SEM and then performing an image analysis of the obtained primary particles.

$$\text{Circularity}(100/SF2)=4\pi\times(A/I^2) \qquad (1)$$

In the expression (1), I represents a circumferential length of the primary particles, and A represents a projected area of the primary particles.

The average circularity of the primary particles is obtained as 50% circularity in a cumulative frequency of circularities of 100 primary particles obtained by the foregoing image analysis. In addition, the circularity distribution index as described later is obtained as a square root of a value obtained by dividing 84% circularity by 16% circularity in cumulative frequency.

—Circularity Distribution Index—

In the specified silica particles, an average circularity distribution index of the primary particles is from 1.05 to 1.50.

It is difficult to produce a particle having an average circularity distribution index of less than 1.05. When the circularity distribution index exceeds 1.50, a minor axis/major axis ratio of the primary particles is large, and particles having a thin shape are included, and hence, there is generated a necessity for separating and using the particles depending upon an application. For example, a particle having a thin shape is preferable for an abrasion application because an effect as an abrasive is obtained; however, the particle having a thin shape is poor in dispersibility into the surface of the resin mother particle, and sufficient strength or fluidity is not obtained, and hence, such a particle having a thin shape is not preferable as an application for, for example, a toner or a developer.

The circularity distribution index of the primary particles is desirably from 1.10 to 1.45.

—Proportion of Primary Particle Having an Average Circularity of 0.95 or More—

In the specified silica particles, a proportion of primary particles having an average circularity of 0.95 or more is not more than 10% by number relative to all of primary particles.

A spherical particle having an average circularity of 0.95 or more is hard to attach onto the surface of the resin mother particle as compared with a heterogeneous particle. For that reason, when a proportion of a spherical particle having an average circularity of 0.95 or more exceeds 10% by number, the proportion of primary particles which are hard to attach onto the surface of the resin mother particle increases, and as a result, for example, attachment properties between the silica particles and the surface of the resin mother particle are impaired. Also, when the silica particles and the resin mother particle are mixed and stirred, the silica particles detach due to a load by stirring, or in the case of storing a mixture of the silica particles and the resin mother particle with time, an attachment position of the silica particles is unevenly distributed, and therefore, such is not preferable.

It is preferable that the proportion of the primary particles having an average circularity of not more than 0.95 is small as far as possible. Specifically, the proportion of the primary particles having an average circularity of not more than 0.95 is preferably not more than 8% by number, and more preferably not more than 5% by number.

[Components and Surface Treatment]

The specified silica particles may be a particle composed mainly of silica, namely $SiO_2$ and may be either crystalline or amorphous. Also, the specified silica particles may be a particle produced using, as a raw material, a silicon compound such as water glass and an alkoxysilane, or may be a particle obtained by pulverizing quartz.

Also, from the viewpoint of dispersibility of the specified silica particles, it is preferable that the surface of the specified silica particles is subjected to a hydrophobic treatment. For example, the specified silica particles are hydrophobilized by bonding an alkyl group onto the surface of the specified silica particles. For that reason, for example, a known organosilicon compound having an alkyl group may be allowed to act on the specified silica particles. Details of a method of the hydrophobic treatment are described later.

[Resin Mother Particle]

Though the components and shape of the resin mother particle which is subjective to the attachment of the specified silica particles are not particularly limited, it is preferable that the volume average particle diameter is from 2 μm to 20 μm.

When the volume average particle diameter of the resin mother particle is 2 μm or more, a lowering of the fluidity can be suppressed. Also, when the volume average particle diameter of the resin mother particle is not more than 20 μm, in the case where the resin particle according to the first exemplary embodiment is used for an application of a powder coating material, slush molding or a recording material, uniformity of a coating film or an image formed upon being incorporated with the resin particle according to the first exemplary embodiment is hardly lowered.

The volume average particle diameter of the resin mother particle is more preferably from 3 μm to 15 μm.

Here, the volume average particle diameter of the resin mother particle is measured using Coulter Multisizer Type II (manufactured by Beckman Coulter, Inc.) and using ISOTON-II (manufactured by Beckman Coulter, Inc.) as an electrolytic solution.

At the measurement, a measurement sample in an amount ranging from 0.5 mg to 50 mg is added to 2 mL of a 5% by mass aqueous solution of, as a dispersant, a surfactant, for example, a sodium alkylbenzenesulfonate. This mixture is added to the electrolytic solution in an amount of from 100 mL to 150 mL.

The electrolytic solution having the sample suspended therein is subjected to a dispersing treatment for one minute using an ultrasonic disperser, and a particle size distribution of particles having a particle diameter ranging from 2 μm to 50 μm is measured using a 100-μm aperture as an aperture size by the Coulter Multisizer Type II. Incidentally, 50,000 particles are sampled.

A cumulative distribution of each of the volume and the number is drawn from the small diameter side with respect to the particle size range (channel) divided on the basis of the thus measured particle size distribution. A particle diameter at an accumulation of 16% is defined as an accumulation volume particle diameter $D_{16v}$, and an accumulation number average particle diameter $D_{16p}$, respectively; a particle diameter at an accumulation of 50% is defined as an accumulation volume particle diameter $D_{50v}$, and an accumulation number average particle diameter $D_{50}$, respectively; and a particle diameter at an accumulation of 84% is defined as an accumulation volume particle diameter $D_{84v}$, and an accumulation number average particle diameter $D_{84p}$, respectively.

Here, the volume average particle diameter is determined as an accumulation volume average particle diameter $D_{50v}$.

The resin mother particle may contain a resin. The resin which the resin mother particle contains is hereinafter also referred to as a "mother resin".

As the mother resin, a thermoplastic resin composed of a natural or synthetic polymer of every kind may be used.

Examples thereof include a polyolefin resin such as polyethylene and polypropylene; a polystyrene resin such as polystyrene and an acrylonitrile/butadiene/styrene copolymer (ABS resin); an acrylic resin such as polymethyl methacrylate and polybutyl methacrylate; a rubbery (co)polymer such as polybutadiene and polyisoprene; a polyester resin such as polyethylene terephthalate and polybutylene terephthalate; a vinyl based resin such as a vinyl chloride resin, a vinyl aromatic resin and a polyvinyl resin; a conjugated diene resin; a polyamide resin; a polyacetal resin; a polycarbonate resin; a thermoplastic polyurethane resin; and a fluorocarbon resin. Such a resin is used solely or in admixture.

Typically, an epoxy resin, a styrene-acrylic resin, a polyamide resin, a polyester resin, a polyvinyl resin, a polyolefin resin, a polyurethane resin or a polybutadiene resin each having a weight average molecular weight of from 5,000 to 100,000 is used solely or in admixture.

In the case where the resin particle according to the first exemplary embodiment is applied to an application for powder coating material, a polyester resin, an epoxy resin or an acrylic resin is suitable as the mother resin.

In the case where the resin particle according to the first exemplary embodiment is applied to an application for slush molding, a thermoplastic polyurethane resin, a vinyl chloride resin, a polyolefin resin, an acrylate based resin powder, a vinyl aromatic resin or a conjugated diene resin is suitable as the mother resin.

In the case where the resin particle according to the first exemplary embodiment is applied to an application for recording material (for example, a toner), a polyester resin or an acrylic resin is suitable as the mother resin.

An additive such as an inorganic particle other than the specified silica particles, an ultraviolet absorbing material and an antioxidant may be further incorporated into (internally added to) the resin mother particle depending upon the desired application.

An attachment amount of the specified silica particles externally added onto the surface of the resin mother particle is preferably in the range of from 5% to 80% in terms of a coverage of the specified silica particles relative to a surface area of the resin mother particle according to the calculation (also referred to as a "calculated coverage").

In the case where a specific gravity of the resin mother particle is defined as A [g/cm$^3$], a particle diameter of the resin particle is defined as R [μm], a charge amount of the resin particle is defined as B [g], a specific gravity of the specified silica particles is defined as a [g/cm$^3$], a particle diameter of the specified silica particles is defined as r [nm], and a charge amount of the specified silica particles defined as b [g], the calculated coverage is calculated as $[(\sqrt{3}\times A\times b\times R)/(0.001\times 2\pi\times a\times B\times r)\times 100]$.

When the calculated coverage is 5% or more, it is possible to suppress a lowering of the fluidity of the resin particle according to the first exemplary embodiment, whereas when the calculated coverage is not more than 80%, it is possible to avoid various obstacles such as pollution to be caused due to detachment of the specified silica particles.

The attachment amount of the specified silica particles is more preferably in the range of from 30% to 70% in terms of the calculated coverage.

(Application)

The resin particle according to the first exemplary embodiment is easy to keep the heterogeneous shape against a mechanical load such as stirring. The resin particle according to the first exemplary embodiment allows the specified silica particles in a heterogeneous shape which are hardly embedded into the resin mother particle to be externally added onto the surface of the resin mother particle. For that reason, in view of the fact that the resin particle according to the first exemplary embodiment is suppressed in deterioration of the aggregation resistance, is hardly sticky and is hard to aggregate, it may be applied to various applications such as a toner, a powder coating material and a recording material. Also, the resin particle according to the first exemplary embodiment may be applied to an application of so-called slush molding (also called "powder slush molding") in which a resin particle is cast into a heated molding die to perform melt molding. In view of the fact that the resin particle according to the first exemplary embodiment is suppressed in deterioration of the aggregation resistance, is hardly sticky and is hard to aggregate, the resin particle is easy to spread in the inside of a die, so that a coating film in which a deviation in thickness is hardly caused may be formed.

<Preparation Method of Resin Particle>

A preparation method of the resin particle according to the first exemplary embodiment may be achieved by allowing the specified silica particles having the already-described physical properties to be externally added onto the surface of the resin mother particle.

Also, a preparation method of the specified silica particles is not particularly limited so far as the resulting silica particles contain primary particles having a volume average particle diameter of from 80 nm to 300 nm, a particle size distribution index of from 1.10 to 1.40, an average circularity of from 0.70 to 0.92 and an average circularity distribution index of from 1.05 to 1.50, in which a proportion of primary particles having an average circularity of 0.95 or more is not more 10% by number.

For example, the silica particles may be obtained by a dry method in which silica particles having a volume average particle diameter exceeding 300 nm is pulverized and classified, or may be produced by a so-called wet method in which a particle is formed by a sol-gel method using, as a raw material, a silicon compound represented by an alkoxysilane. As the wet method, in addition to the sol-gel method, there is also included a method of obtaining a silica sol using water glass as a raw material.

In the resin particle according to the first exemplary embodiment, the silica particles (specified silica particles) containing primary particles having a volume average particle diameter of from 80 nm to 300 nm, a particle size distribution index of from 1.10 to 1.40, an average circularity of from 0.70 to 0.92 and an average circularity distribution index of from 1.05 to 1.50 attaches onto the surface of the resin mother particle. Therefore, in order to prepare a resin particle having the specified silica particles having such various physical properties attached thereto, it is desirable to adopt a preparation method of a resin particle having the following steps according to a second exemplary embodiment.

The preparation method of a resin particle according to the second exemplary embodiment includes a step of preparing an alkaline catalyst solution containing an alkaline catalyst in a concentration of from 0.6 mol/L to 0.85 mol/L in an alcohol-containing solvent (also referred to as an "alkaline catalyst solution preparing step"); a step of supplying a tetraalkoxysilane in a supply amount of 0.002 mol/(mol·min) or more and less than 0.006 mol/(mol·min) relative to the alcohol into the alkaline catalyst solution and also supplying an alkaline catalyst in an amount of from 0.1 mol to 0.4 mol per mole of the total supply amount of the tetraalkoxysilane to be supplied per minute to obtain silica particles (specified silica particles) (also referred to as a "silica particle forming step"); and a step of allowing the obtained silica particles (specified silica particles) to be externally added onto the surface of a resin mother particle (also referred to as a "silica particle attaching step").

Namely, the preparation method of the specified silica particles is concerned with a method in which a tetraalkoxysilane as a raw material is allowed to react in the presence of an alcohol in which an alkaline catalyst in the foregoing concentration is contained while supplying the tetraalkoxysilane that is a raw material and separately, an alkaline catalyst that is a catalyst in the foregoing relations, respectively in the foregoing relation, thereby forming specified silica particles, and the formed specified silica particles are allowed to be externally added onto the surface of the resin mother particle of the resin particle.

In the preparation method of a resin particle according to the second exemplary embodiment, the specified silica particles in a heterogeneous shape, which is small in the generation of a coarse aggregate, is obtained. While a reason for this is not elucidated yet, it may be considered that this is caused due to the following reason.

First of all, when an alkaline catalyst solution containing an alkaline catalyst in an alcohol-containing solvent is prepared, and a tetraalkoxysilane and an alkaline catalyst are supplied, respectively in this solution, the tetraalkoxysilane supplied into the alkaline catalyst solution reacts to form a nucleus particle. At that time, when the alkaline catalyst concentration in the alkaline catalyst solution falls within the foregoing range, it may be considered that a nucleus particle in a heterogeneous shape is formed while suppressing the formation of a coarse aggregate such as a secondary aggregate. It may be considered that this is caused due to the matter that though in addition to the catalytic action, the alkaline catalyst has an action to coordinate to the surface of the nucleus particle to be formed, thereby contributing to the formation and dispersion stability of the nucleus particle, when its amount falls within the foregoing range, the alkaline catalyst does not uniformly coat the surface of the nucleus particle (namely, the alkaline catalyst unevenly attaches onto the surface of the nucleus particle), and therefore, while the dispersion stability of the nucleus particle is kept, partial deviations in surface tension and chemical affinity of the nucleus particle are caused, so that the nucleus particle in a heterogeneous shape is formed.

Then, when the supply of each of the tetraalkoxysilane and the alkaline catalyst is continued, the formed nucleus particle grows due to the reaction of the tetraalkoxysilane, whereby silica particles are obtained. Here, it may be considered that by performing the supply of each of the tetraalkoxysilane and the alkaline catalyst while keeping the supply amounts thereof in the foregoing relations, the nucleus particle in a heterogeneous shape undergoes particle growth with its heterogeneous shape being kept while suppressing the formation of a coarse aggregate such as a secondary aggregate, and as a result, silica particles in a heterogeneous shape are formed. This is because by allowing the supply amounts of the tetraalkoxysilane and the alkaline catalyst to satisfy with the foregoing relations, the partial deviations in tension and chemical affinity on the surface of the nucleus particle are kept while keeping dispersion of the nucleus particle, so that the particle growth of the nucleus particle is caused while keeping the heterogeneous shape.

In consequence, primary particles having an average circularity of 0.95 or more are hardly formed, and it is easy to regulate the proportion of primary particles having an average circularity of 0.95 or more to not more than 10% by number.

Here, it may be considered that the supply amount of the tetraalkoxysilane is related to the particle size distribution or the circularity of the silica particles. It may be considered that by regulating the supply amount of the tetraalkoxysilane to 0.002 mol/(mol·min) and less than 0.006 mol/(mol·min), a contact probability between the tetraalkoxysilane added dropwise and the nucleus particle is decreased, and before a reaction between the tetraalkoxysilanes with each other occurs, the tetraalkoxysilane is supplied into the nucleus particle without a deviation. In consequence, it may be considered that the reaction between the tetraalkoxysilane and the nucleus particle may be caused without a deviation. As a result, it may be considered that silica, particles with a narrow distribution width may be produced while suppressing scattering of the particle growth.

In consequence, it may be considered that by allowing the supply amount of the tetraalkoxysilane to fall within the foregoing range, primary particles having a particle size distribution index of from 1.10 to 1.40, an average circularity of from 0.70 to 0.92 and an average circularity distribution index of from 1.05 to 1.50 are easily formed.

Incidentally, it may be considered that the volume average particle diameter of the silica particles is dependent upon the total supply amount of the tetraalkoxysilane.

In the light of the above, in the preparation method of a resin particle according to the second exemplary embodiment, it may be considered that the specified silica particles in a heterogeneous shape, in which a proportion of primary particles having an average circularity of 0.95 or more is not more than 10% by volume and which are small in the formation of a coarse aggregate and have a particle size distribution index of from 1.10 to 1.40, an average circularity of from 0.70 to 0.92 and an average circularity distribution index of from 1.05 to 1.50, are obtained.

Also, in the alkaline catalyst solution preparing step and the silica particles forming step (the both steps will be also generally called a "specified silica particle producing step") in the preparation method of a resin particle according to the second exemplary embodiment, it may be considered that a nucleus particle in a heterogeneous shape is formed, and the nucleus particle is allowed to grow while keeping this heterogeneous shape, thereby forming silica particles. Therefore, it may be considered that silica particles in a heterogeneous shape having high shape stability against a mechanical load are obtained.

Also, in the specified silica particle producing step, it may be considered that the particle is allowed to grow in a state where the formed nucleus particle in a heterogeneous shape keeps its heterogeneous shape, whereby the silica particles are obtained. Therefore, it may be considered that silica particles which are strong against a mechanical load and are hardly broken are obtained.

Also, in the specified silica particle producing step, in view of the fact that the particle formation is performed by supplying each of the tetraalkoxysilane and the alkaline catalyst into the alkaline catalyst solution and causing a reaction of the tetraalkoxysilane, as compared with the case of producing silica particles in a heterogeneous shape by a conventional sol-gel method, a total amount of the used alkaline catalyst is small, and as result, an omission of a removal step of the alkaline catalyst is realized. This is advantageous especially in the ease where silica particles are applied to products in which a high purity is required.

—Alkaline Catalyst Solution Preparing Step—

First of all, the alkaline catalyst solution preparing step is described.

In the alkaline catalyst solution preparing step, an alcohol-containing solvent is prepared, to which is then added an alkaline catalyst to prepare an alkaline catalyst solution.

The alcohol-containing solvent may be a solvent composed of an alcohol solely, or may be a mixed solvent of an alcohol with other solvent such as water; ketones (for example, acetone, methyl ethyl ketone, methyl isobutyl ketone, etc.); cellosolves (for example, methyl cellosolve, ethyl cellosolve, butyl cellosolve, cellosolve acetate, etc.); and ethers (for example, dioxane, tetrahydrofuran, etc.), if desired. In the case of a mixed solvent, it would be better that an amount of the alcohol relative to other solvent is 80% by mass or more (desirably 90% by mass or more).

Incidentally, examples of the alcohol include lower alcohols such as methanol and ethanol.

Meanwhile, the alkaline catalyst is a catalyst for accelerating the reaction (for example, a hydrolysis reaction or a condensation reaction) of the tetraalkoxysilane, and examples thereof include basic catalysts such as ammonia, urea, a monoamine and a quaternary ammonium salt. Of these, ammonia is especially desirable.

A concentration (content) of the alkaline catalyst is from 0.6 mol/L to 0.85 mol/L, desirably from 0.63 mol/L to 0.78 mol/L, and more desirably from 0.66 mol/L to 0.75 mol/L.

When the concentration of the alkaline catalyst is less than 0.6 mol/L, dispersibility of a formed nucleus particle in a growth process of the nucleus particle becomes instable, so that there is a concern that a coarse aggregate such as a secondary aggregate is formed, or gelation occurs, thereby deteriorating the particle size distribution.

On the other hand, when the concentration of the alkaline catalyst is more than 0.85 mol/L, stability of a formed nucleus particle becomes excessive, a nucleus particle in a true spherical shape is formed, and a nucleus in a heterogeneous shape having an average circularity of not more than 0.85 is not obtained, and as a result, the specified silica particles in a heterogeneous shape is not obtained.

Incidentally, the concentration of the alkaline catalyst is a concentration relative to the alcohol catalyst solution (the alkaline catalyst+the alcohol-containing solvent).

—Silica Particle Forming Step—

Next, the silica particle forming step is described.

The silica particle forming step is a step of supplying each of a tetraalkoxysilane and an alkaline catalyst into the alkaline catalyst solution to subject the tetraalkoxysilane to a reaction (for example, a hydrolysis reaction or a condensation reaction) in the alkaline catalyst solution, thereby forming silica particles.

In this silica particle forming step, at the beginning of supply of the tetraalkoxysilane, a nucleus particle is formed by the reaction of the tetraalkoxysilane (nuclear particle forming stage), and thereafter, the silica particles are formed through growth of this nucleus particle (nucleus particle growing stage).

Examples of the tetraalkoxysilane which is supplied into the alkaline catalyst solution include tetramethoxysilane, tetraethoxysilane, tetrapropoxysilane and tetrabutoxysilane. However, from the standpoints of controllability of the reaction rate, the shape, particle diameter and particle size distribution of the obtained silica particles, and the like, tetramethoxysilane or tetraethoxysilane is suitable.

A supply amount of the tetraalkoxysilane is 0.002 mol/(mol·min) or more and less than 0.006 mol/(mol·min) relative to the alcohol in the alkaline catalyst solution.

This means that the tetraalkoxysilane is supplied in a supply amount of 0.002 mol or more and less than to 0.006 mol per minute relative to one mole of the alcohol used in the step of preparing an alkaline catalyst solution.

By allowing the supply amount of the tetraalkoxysilane to fall within the foregoing range, the primary particles may be allowed to have such physical properties that the particle size distribution index is from 1.10 to 1.40, the average circularity is from 0.70 to 0.92, and the circularity distribution index of from 1.05 to 1.50.

Incidentally, though the volume average particle diameter of the silica particles varies with the kind of the tetraalkoxysilane or the reaction condition, for example, by regulating a total supply amount of the tetraalkoxysilane used for the reaction of particle formation to 0.855 mol or more per liter of the silica particle dispersion liquid, primary particles having a volume average particle diameter of 80 nm or more are obtained, and by regulating a total supply amount of the tetraalkoxysilane used for the reaction of particle formation to not more than 3.288 mol per liter of the silica particle dispersion liquid, primary particles having a volume average particle diameter of not more than 300 μm are obtained.

When the supply amount of the tetraalkoxysilane is less than 0.002 mol/(mol·min), a contact probability between the tetraalkoxysilane added dropwise and the nucleus particle is more decreased. However, it takes a long period of time for completion of the dropwise addition of the total supply amount of the tetraalkoxysilane, and the preparation efficiency is poor.

When the supply amount of the tetraalkoxysilane is 0.006 mol/(mol·min) or more, it may be considered that before the tetraalkoxysilane added dropwise and the nucleus particle react with each other, a reaction between tetraalkoxysilanes with each other is caused. For that reason, in view of the fact that a deviation of the supply of the tetraalkoxysilane into the nucleus particle is accelerated, thereby bringing scattering of the particle growth, the volume average particle diameter and the distribution width of shape distribution are expanded, so that silica particles having a particle size distribution index of from 1.10 to 1.40, an average circularity of from 0.70 to 0.92 and an average circularity distribution index of from 1.05 to 1.50 may not be produced.

The supply amount of the tetraalkoxysilane is desirably from 0.002 mol/(mol·min) to 0.0046 mol/(mol·min), and more desirably from 0.002 mol/(mol·min) to 0.0033 mol/(mol·min).

Meanwhile, examples of the alkaline catalyst which is supplied into the alkaline catalyst solution include those exemplified above. Though this alkaline catalyst to be supplied may be the same as or different from the alkaline catalyst previously contained in the alkaline catalyst solution, it would be better to use the alkaline catalyst of the same kind.

A supply amount of the alkaline catalyst is from 0.1 mol to 0.4 mol, desirably from 0.14 mol to 0.35 mol, and more desirably from 0.18 mol to 0.30 mol per mole of the total supply amount of the tetraalkoxysilane to be supplied per minute.

When the supply amount of the alkaline catalyst is less than 0.1 mol, dispersibility of a formed nucleus particle in a growth process of the nucleus particle becomes instable, so that there is a concern that a coarse aggregate such as a secondary aggregate is formed, or gelation occurs, thereby deteriorating the particle size distribution.

On the other hand, when the supply amount of the alkaline catalyst is more than 0.4 mol, stability of a formed nucleus particle becomes excessive, and even when a nucleus particle in a heterogeneous shape is formed at a nucleus particle forming stage, the nucleus particle grows in a spherical shape at its nucleus particle growth stage, so that silica particles in a heterogeneous shape are not obtained.

Here, in the silica particle forming step, each of the tetraalkoxysilane and the alkaline catalyst is supplied into the alkaline catalyst solution. The supply method may be a mode of continuously supplying them, or a mode of intermittently supplying them.

Also, in the silica particle forming step, a temperature in the alkaline catalyst solution (temperature at the time of supply) may be, for example, in the range of from 5° C. to 50° C. and is desirably in the range of from 15° C. to 40° C.

The specified silica particles are obtained through the foregoing steps. Though the specified silica particles obtained in this state are obtained in a state of a dispersion liquid, it may be used as a silica particle dispersion liquid as it is, or may be taken out and used as a powder of the silica particles after removing the solvent.

In the case of using the specified silica particles as a silica particle dispersion liquid, a solids concentration of the silica particles may be adjusted upon being diluted with water or an alcohol or being concentrated, if desired. Also, the silica particle dispersion liquid may be used upon being subjected to solvent substitution with a water-soluble organic solvent such as other alcohol, an ester and a ketone.

Meanwhile, in the case of using the specified silica particles as a powder of the silica particles, it is necessary to remove the solvent from the silica particle dispersion liquid. Examples of a method of removing this solvent include known methods such as (1) a method of performing drying using a vacuum dryer, a tray type dryer, etc. after removing the solvent by means of filtration, centrifugation, distillation or the like; and (2) a method of directly drying the slurry using a fluidized layer dryer, a spray dryer or the like. Though a drying temperature is not particularly limited, it is desirably not higher than 200° C. When the drying temperature is higher than 200° C., bonding among primary particles to each other or generation of coarse particles due to condensation of a silanol group remaining on the surface of the silica particles is easy to occur.

It would be better that if desired, the dried silica particles are crushed and sieved, thereby removing a coarse particle or aggregate. Though a crushing method is not particularly limited, it is, for example, performed by a dry type pulverizer such as a jet mill, a vibration mill, a ball mill and a pin mill. A sieving method is, for example, performed using a known device such as a vibration sieve and a wind force sieve.

The specified silica particles obtained by the specified silica particles producing step may be used after subjecting the surface of the specified silica particles to a hydrophobic treatment with a hydrophobic treatment agent.

Examples of the hydrophobic treatment agent include known organosilicon compounds having an alkyl group (for example, a methyl group, an ethyl group, a propyl group, a butyl group, etc.). Specific examples thereof include silazane compounds (for example, hexamethyldisilazane, tetramethyldisilazane, etc.) and silane compounds (for example, methyltrimethoxysilane, dimethyldimethoxysilane, trimethylchlorosilane, trimethylmethoxysilane, etc.). The hydrophobic treatment agent may be used solely or in combination of plural kinds thereof.

Of these hydrophobic treatment agents, organosilicon compounds having a trimethyl structure, such as trimethylmethoxysilane and hexamethyldisilazane, are suitable.

Though a use amount of the hydrophobic treatment agent is not particularly limited, in order to obtain a hydrophobic effect, it is, for example, from 1% by mass to 100% by mass, and desirably from 5% by mass to 80% by mass relative to the specific silica particles.

Examples of a method of obtaining a hydrophobic silica particle dispersion liquid having been subjected to a hydrophobic treatment with a hydrophobic treatment agent include a method of obtaining a hydrophobic silica particle dispersion liquid by adding a necessary amount of a hydrophobic treatment agent to a silica particle dispersion liquid having the specified silica particles dispersed therein and allowing the mixture to react with stirring at a temperature ranging from 30° C. to 80° C., thereby subjecting the specified silica particles to a hydrophobic treatment. When this reaction temperature is a lower temperature than 30° C., the hydrophobic reaction hardly proceeds, whereas when the reaction temperature is a temperature exceeding 80° C., there may be the case where gelation of the dispersion liquid by self-condensation of the hydrophobic treatment agent or aggregation among silica particles to each other is easy to occur.

Meanwhile, examples of a method of obtaining powdered hydrophobic silica particles include a method in which a hydrophobic silica particle dispersion liquid is obtained by the foregoing method and then dried by the foregoing method, thereby obtaining a powder of a hydrophobic silica particle; a method in which a silica particle dispersion liquid is dried to obtain a powder of hydrophilic silica particles, which is then subjected to a hydrophobic treatment by the addition of a hydrophobic treatment agent, thereby obtaining a powder of a hydrophobic silica powder; and a method in which after obtaining a hydrophobic silica particle dispersion liquid, the hydrophobic silica particle dispersion liquid is dried to obtain a powder of a hydrophobic silica particle, which is further subjected to a hydrophobic treatment by the addition of a hydrophobic treatment agent, thereby obtaining a powder of a hydrophobic silica particle.

Here, examples of a method of subjecting a powdered specific silica particles to a hydrophobic treatment include a method in which a powdered hydrophilic silica particles are stirred within a treatment tank such as a Henschel mixer and a fluidized bed, a hydrophobic treatment agent is added thereto, and the inside of the treatment tank is heated to gasify the hydrophobic treatment agent, thereby allowing it to react with a silanol group on the surface of the powdered specified silica particle. Though a treatment temperature is not particularly limited, it may be, for example, from 80° C. to 300° C., and it is desirably from 120° C. to 200° C.

—Silica Particle Attaching Step—

In the silica particle attaching step, silica particles (specified silica particles) obtained in the silica particle forming step is allowed to be externally added onto the surface of the resin mother particle.

Examples of a method of allowing the specified silica particles onto the surface of the resin mother particle include a method in which the specified silica particles and the resin particle and optionally, a component to be allowed to attach are added and stirred in a V-type blender, a Henschel mixer, a Loedige mixer or the like. The specified silica particles may be allowed to be externally added onto the surface of the resin mother particle in a divided manner.

As described previously, in the resin particle according to the first exemplary embodiment, it is preferable that the specified silica particles attach at a calculated coverage ranging from 5% to 80% onto the surface of the resin mother particle.

In order to regulate the attachment amount of the specified silica particles to the foregoing range, it would be better to add the specified silica particles in an amount of from 0.1% by mass to 10% by mass relative to the total mass of the resin mother particle in a V-type blender, a Henschel mixture, a Loedige mixer or the like.

(Preparation of Resin Mother Particle)

The resin mother particle may be, for example, prepared by a method in which a mother resin is heat melted and kneaded, followed by pulverization and classification (kneading and pulverization method); a method in which an oil phase having a mother resin dissolved in a water-soluble organic solvent is suspended and dispersed in an aqueous phase containing a dispersant, followed by removal of the solvent (dissolution and suspension method); or a method in which a mother resin obtained from a mother resin monomer by means of emulsion polymerization or the like is aggregated to form a particle (emulsion polymerization and aggregation method).

In the case of incorporating the foregoing respective components such as an organic particle into the resin mother particle, it would be better to previously mix the mother resin and the foregoing respective components. In the case of an emulsion polymerization and aggregation method, it would be better to mix the mother resin monomer and the foregoing respective components and subject the mixture to emulsion polymerization.

EXAMPLES

The invention is more specifically described below with reference to the following Examples. However, it should not be construed that the respective Examples limit the invention. Also, all parts and percentages are on a mass basis unless indicated.

Example 1

—Alkaline Catalyst Solution Preparing Step [Preparation Of Alkaline Catalyst Solution (1)]—

In a glass-made reaction vessel having a volume of 3 L and equipped with a metal-made stirring blade, a dropping nozzle (micro tube pump made of Teflon (a registered trademark)) and a thermometer, 600 g of methanol and 100 g of 10% ammonia water are charged and mixed with stirring to obtain an alkaline catalyst solution (1). At that time, an ammonia catalyst amount, i.e., an $NH_3$ amount in the alkaline catalyst solution (1) ($NH_3$ [mol]/(ammonia+methanol) [L]) is 0.68 moles/L.

—Particle Forming Step [Preparation of Silica Particle Suspension (1)]—

Subsequently, a temperature of the alkaline catalyst solution (1) is adjusted to 25° C., and the alkaline catalyst solution (1) is substituted with nitrogen. Thereafter, dropwise addition of 450 g of tetramethoxysilane (TMOS) and 270 g of ammonia water having a catalyst ($NH_3$) concentration of 4.44% in the following supply amounts is simultaneously started while stirring the alkaline catalyst solution (1), and the dropwise addition is performed over 30 minutes, thereby obtaining a suspension of the silica particles (silica particle suspension (1)).

Here, the supply amount of tetramethoxysilane (TMOS) is set to 15 g/min, namely 0.0053 mol/(mol·min) relative to a total molar number of methanol in the alkaline catalyst solution (1).

Also, the supply amount of the 4.44% ammonia water is set to 9 g/min relative to a total supply amount of the tetraalkoxysilane to be supplied per minute (0.0987 mol/min). This is corresponding to 0.238 mol/min per mole of the total supply amount of the tetraalkoxysilane to be supplied per minute.

The particle of the resulting silica particle suspension (1) is measured by the already-described particle size analyzer. As a result, its average particle diameter ($D_{50v}$) and particle size distribution index ($GSD_v$) are found to be 170 nm and 1.32, respectively.

From a molecular weight (152.21) of tetramethoxysilane (TMOS), a molecular weight (60.084) of silica and a total addition amount (450 g) of TMOS, a solids content [g] of the silica particle suspension (1) is calculated to be 450×60.084/152.21=177.6 g.

Incidentally, from a total amount of the components to be added in the preparing step [methanol (600 g) and ammonia water (100 g)], a total addition amount of the components added in the particle forming step [TMOS (450 g) and ammonia water (270 g)] and the foregoing solids content [177.6 g], a solids fraction [%] of the silica particle suspension (1) is calculated to be 177.6×100/(600+100+450+270)=12.51%.

—Hydrophobic Treatment of Silica Particles—

200 g (solids content: 12.51%) of the silica particle suspension (1) is subjected to a hydrophobic treatment by the addition of 5.59 g of trimethylsilane. Thereafter, the resultant is dried upon heating at 65° C. using a hot plate, thereby forming hydrophobic silica particles (1) in a heterogeneous shape.

The resulting hydrophobic silica particles (1) are added to a resin particle having a volume average particle diameter of 100 μm, and 100 primary particles of the hydrophobic silica particles (1) are subjected to SEM. Subsequently, the resulting SEM is subjected to image analysis. As a result, the primary particles of the hydrophobic silica particles (1) have an average circularity of 0.87 and an average circularity distribution index of 1.23, and a proportion of primary particles having an average circularity of 0.95 or more is 2.9% by number.

—Silica Particle Attaching Step—

(Preparation of Mother Resin)

In a reaction vessel equipped with a stirrer, a thermometer, a condenser and a nitrogen gas-introducing tube, the following components are charged.

Dimethyl terephthalate: 23% by mol

Isophthalic acid: 10% by mol

Dodecenylsuccinic anhydride: 15% by mol

Trimellitic anhydride: 3% by mol

Bisphenol A ethylene oxide 2-mole adduct: 5% by mol

Bisphenol A propylene oxide 2-mole adduct: 45% by mol

Subsequently, after substituting the inside of the reaction vessel with a dry nitrogen gas, dibutyltin oxide as a catalyst is added in a proportion of 0.06% by mole, and the respective components are allowed to react with stirring under a nitrogen gas stream at 190° C. for 7 hours.

Furthermore, the temperature in the reaction vessel is elevated to about 250° C., the reaction is performed with stirring for 5.0 hours, and the inside of the reaction vessel is then evacuated to 10.0 mg. The reaction is further performed with stirring under reduced pressure for 0.5 hours, thereby obtaining an amorphous polyester resin having a polar group in a molecule thereof (mother resin (1)).

(Preparation of Resin Mother Particle)

100 parts by mass of the resulting amorphous polyester resin (mother resin (1)) is melted and kneaded by a Banbury mixer type kneader. The kneaded material is molded in a plate form having a thickness of 1 cm by using a pressure roll; coarsely pulverized to an extent of about several millimeters by using a Fitz mill type pulverizer; more finely pulverized by using an IDS type pulverizer; and further classified by using an elbow type classifier, thereby obtaining an amorphous resin mother particle (1) having a volume average particle diameter of 7 μm.

(Attachment of Silica Particle)

To 20 g of the resulting mother resin (1) having a volume average particle diameter of 7 μm, the hydrophobic silica particles (1) are added in an amount (50%) shown in the column of "Calculated coverage (%)" of "Silica particle" of "Particle attached step" in Table 1 and mixed in a 0.4-L sample mill at 15,000 rpm for 30 seconds, thereby obtaining a resin particle (1) having the hydrophobic silica particle (1) attached thereto.

On that occasion, the resin mother particle (1) and the hydrophobic silica particles (1) are added in the sample mill in a ratio of the resin mother particle (1) to the hydrophobic silica particles (1) of 20/1.26 (on a mass basis).

<Evaluation of Resin Particle>

The resulting resin particle (1) is evaluated with respect to various characteristics. As a result, the resin particle (1) having the hydrophobic silica particles (1) attached thereto is excellent in fluidity, and even after receiving a mechanical load such as stirring, the hydrophobic silica particles (1) are not liberated from the surface of the resin mother particle, and aggregation is suppressed.

Incidentally, details of evaluation methods of the various characteristics of the resin particle (1) are as follows.

(Evaluation of Dispersibility of Silica Particle)

With respect to the resin particle (1) before applying a mechanical load, after the preparation, the surface of the resin particle (1) is observed by SEM. Furthermore, an attached area of the hydrophobic silica particles (1) is measured by means of image analysis, and a coverage of the hydrophobic silica particles (1) are then calculated from a ratio of a total attached area D of the specified silica particle to a surface area C of the resin mother particle [(D/C)×100], thereby making evaluation according to the following evaluation criteria.

—Evaluation Criteria (Dispersibility)—

A: The silica particles attach onto the surface of the resin mother particle at a coverage of 45% or more without being unevenly distributed, and an aggregate is not substantially found.

B: Though an aggregate of the silica particles is slightly found, the silica particles attach onto the surface of the resin mother particle at a coverage of 40% or more and less than 45% without being unevenly distributed.

C: An aggregate of the silica particles is found here and there, and a coverage of the silica particles on the surface of the resin mother particle is less than 40%, so that dispersibility is poor.

(Evaluation of Dispersibility of Silica Particles After Applying Mechanical Load)

Dispersibility of the silica particles after applying a mechanical load to the resin particle is evaluated. Specifically, the evaluation is performed as follows.

5 g of the resin particle (1) and 200 g of a 100-μm iron powder are charged in a glass bottle and mixed for 60 minutes by a tumbler shaker. Thereafter, the surface of the resin particle (1) is observed by SEM. Further, an attached area of the hydrophobic silica particles (1) is observed by means of image analysis, from which is then calculated a coverage of the hydrophobic silica particles (1), following by making evaluation according to the following criteria.

—Evaluation Criteria (Dispersibility after Giving Mechanical Load)—

A: Though transfer of the silica particles into a concave of the surface of the resin mother particle is slightly found, a coverage of the silica particles on the surface of the resin mother particle is 40% or more.

B: Though transfer of the silica particles into a concave of the surface of the resin mother particle is found, a coverage of the silica particles on the surface of the resin mother particle is 30% or more and less than 40%.

C: Transfer of the silica particles into a concave of the surface of the resin mother particle is considerably found, and a coverage of the silica particles on the surface of the resin mother particle is less than 30%.

(Evaluation of Fluidity of Resin Particle after Applying Mechanical Load)

Aerated apparent specific gravity and packed apparent specific gravity of the resin particle are measured using a powder tester, manufactured by Hosokawa Micron Corporation, a compression ratio is determined from the aerated apparent specific gravity and the packed apparent specific gravity according to the following expression, and fluidity of the resin particle is evaluated from the calculated compression ratio.

Compression ratio=[(Packed apparent specific gravity)−(Aerated apparent specific gravity)]/(Packed apparent specific gravity)]

Incidentally, the "aerated apparent specific gravity" as referred to herein means a measured value deduced by packing the resin particle in a sample cup having a volume of 100 $cm^3$ and weighing it and refers to a packing specific gravity in a state where the resin particle is allowed to naturally drop into the sample cup. The "packed apparent specific gravity" as referred to herein means an apparent specific gravity obtained by performing deaeration by tapping from a state of the aerated apparent specific gravity and rearranging the resin particle, thereby more densely packing the resin particle.

Also, in the evaluation of fluidity, mixing is performed for 60 minutes using a tumbler shaker, thereby giving a mechanical load in the same manner as in the evaluation of dispersibility.

—Evaluation Criteria (Fluidity)—

A: The compression ratio is less than 0.25.

B: The compression ratio is 0.25 or more and less than 0.40.

C: The compression ratio is 0.40 or more.

(Evaluation of Aggregation Properties of Resin Particle)

5 g of the resin particle (1) and 200 g of a 100-μm iron powder are charged in a glass bottle and mixed for 30 minutes by a tumbler shaker, and the iron powder is then removed by a sieve having a pore size of 75 μm. Thereafter, 2 g of the resin particle (1) having passed through the sieve is placed on a sieve of 45 μm and vibrated in a vibration width of 1 mm for 90 seconds. The behavior of dropping of the resin particle (1) is observed, thereby making evaluation according to the following criteria.

Degree of aggregation (%)=(Mass on 45-μm net (g))÷2×100

—Evaluation Criteria (Aggregation Properties)—

A: The degree of aggregation is less than 10%.

B: The degree of aggregation is 10% or more and less than 30%.

C: The degree of aggregation is 30% or more.

Preparation conditions, physical properties and evaluation results of the hydrophobic silica particle (1) and the resin particle (1) are shown in Tables 1 and 2.

Examples 2 to 10 and Comparative Examples 1 to 9

Alkaline catalyst solutions (2) to (10) and alkaline catalyst solutions (101) and (103) to (109) are prepared in the same manner, except that in the preparation of the alkaline catalyst solution (1), "100 g" of the 10% ammonia water is changed to an amount shown in the column of "Mass (g)" of "10% ammonia water" of "Components to be added" in Table 1.

Incidentally, an alkaline catalyst solution (102) is prepared in the same manner, except that in the preparation of the alkaline catalyst solution (1), in addition to 600 g of methanol and 10% ammonia water having a composition shown in Table 1, 100 g of water is mixed.

Each catalyst amount, i.e., the $NH_3$ amount in each of the foregoing alkaline catalyst solutions (2) to (10) and alkaline catalyst solutions (101) to (109) after the preparation is shown in the column of "$NH_3$ amount [mol/L]" of "10% ammonia water" of "Components to be added" in Table 1.

Subsequently, it is attempted to prepare silica particle suspensions (2) to (10) and silica particle suspension (101) to (109) in the same manner, except that in the preparation of the silica particle suspension (1), each of the alkaline catalyst solutions (2) to (10) or the alkaline catalyst solutions (101) to (109) is used in place of the alkaline catalyst solution (1), and the amount and supply amount of the tetramethoxysilane to be added to the alkaline catalyst solution and the catalyst concentration, amount and supply amount of the ammonia water to be added to the alkaline catalyst solution are changed to amounts shown in Table 1.

Specifically, with respect to the amount and supply amount of the tetramethoxysilane to be added to the alkaline catalyst solution, the amount "450 g" of the tetramethoxysilane is changed to an amount shown in the column of "Mass (g)" of "TMOS" of "Total addition amount" in Table 1, and the supply amount "15 g/min" of the tetramethoxysilane is changed to an amount shown in the column of "TMOS" of "Supply amount [g/min]" in Table 1.

With respect to the catalyst concentration, amount and supply amount of the ammonia water to be added to the alkaline catalyst solution, the catalyst amount of ammonia water "4.44%" is changed to an amount shown in the column of "$NH_3$ concentration [%]" of "Ammonia water" of "Total addition amount" in Table 1, and the supply amount of ammonia water "9 g/min" is changed to an amount shown in the column of "Ammonia amount" of "Supply amount [g/min]" in Table 1.

Here, the amount that is the supply amount of the ammonia catalyst into each of the alkaline catalyst solutions (2) to (10) and the alkaline catalyst solutions (101) to (109) and which is an amount per mole of the total supply amount of the tetraalkoxysilane to be supplied per minute is shown in the column of "$NH_3$ amount [mole/min] (vs. TMOS)" of "Relative amount" in Table 1.

Also, the amount that is the supply amount of the tetraalkoxysilane (TMOS) into each of the alkaline catalyst solutions (2) to (10) and the alkaline catalyst solutions (101) to (109) and which is an amount per mole of methanol in each of the alkaline catalyst solutions (2) to (10) and the alkaline catalyst solutions (101) to (109) is shown in the column "TMOS amount [mol/(mol·min)] (vs. methanol)" of "Relative amount" in Table 1.

With respect to each of the resulting silica particle suspensions (2) to (10) and silica particle suspensions (101) to (103) and (105) to (109), a volume average particle diameter ($D_{50v}$) and a particle size distribution index ($GSD_v$) are measured in the same manners as in the silica particle suspension (1). The measurement results are shown in Table 2.

Incidentally, with respect to the silica particle suspension (104) of Comparative Example 4, gelation occurs during the particle forming step, so that no hydrophilic silica particles are obtained.

Thereafter, a hydrophobic treatment is performed in the same manner, except that in the hydrophobic treatment of the silica particles in the silica particle suspension (1), the silica particle suspension (1) is replaced by each of the silica particle suspensions (2) to (10) and the silica particle suspensions (101), (102) and (105) to (109), thereby obtaining hydrophobic silica particles (2) to (10) and hydrophobic silica particles (101), (102) and (105) to (109).

A solid content [g] of each of the silica particle suspensions (2) to (10) and the silica particle suspensions (101), (102) and (105) to (109) used for the hydrophobic treatment is shown in Table 1.

A solid content [g] of each of the silica particle suspension (103) having not been subjected to a hydrophobic treatment and the gelled silica particle suspension (104) is also shown in Table 1.

Incidentally, the solids content [g] of each of the silica particle suspensions is calculated to be [Total addition amount]×60.084/152.21 [g] from a molecular weight (152.21) of tetramethoxysilane (TMOS), a molecular weight (60.084) of silica and a total addition amount of TMOS (amount show in the column of "TMOS" of "Total addition amount" of "Particle forming step" in Table 1).

The silica particles in the silica particle suspension (103) are dried upon heating using a hot plate in the same manner as in the silica particle suspension (1), except that no hydrophobic treatment is performed, thereby obtaining a hydrophilic silica particle (103).

Each of the resulting hydrophobic silica particles (2) to (10), hydrophobic silica particles (101), (102) and (105) to (109) and hydrophilic silica particles (103) are observed through SEM photography in the same manner as in the hydrophobic silica particle (1) and subjected to image analysis. An average particle diameter ($D_{50v}$), a particle size distribution, an average circularity [100/SF2], an average circularity distribution and an amount of a primary particle having an average circularity of 0.95 or more of each of the primary particles obtained by the image analysis are shown in the column of "Characteristic features of silica particle" in Table 2.

Also, distinction of hydrophobicity and hydrophilicity and shape of the resulting silica particle are shown in the column of "Hydrophilicity or hydrophobicity" and the column of "Shape" of "Characteristic features of silica particle", respectively in Table 2.

(Preparation of Resin Particle)

Resin particles (2) to (10) of Examples 2 to 10 and resin particles (101) to (102), (103) and (105) to (109) of Comparative Examples 1, 2, 3 and 5 to 9 are produced in the same manner as in the preparation of the resin particle (1) of Example 1, except that the hydrophobic silica particle (1) is replaced by the hydrophobic silica particles (2) to (10), the hydrophobic silica particles (101) to (102), the hydrophilic silica particles (103) and the hydrophobic silica particles (105) to (109), respectively.

Each of the resulting resin particles (2) to (10), (101) to (103) and (105) to (109) is evaluated in the same manners as in the resin particle (1). The evaluation results are shown in Table 2.

Examples 11 and 12

Resin mother particles (2) and (3) having a volume average particle diameter of 2 μm and 20 μm, respectively are produced in the same manner as in the preparation of the resin mother particle (1), except that a cut point of the elbow type classifier is changed.

Resin particles (11) and (12) are produced in the same manner as in Example 1, except that in the preparation of the resin particle (1), the resin mother particle (1) is replaced by the resin mother particles (2) and (3), respectively.

Each of the resulting resin particles (11) and (12) is evaluated in the same manner as in the resin particle (1). The evaluation results are shown in Table 2.

Example 13

100 g of thoroughly dehydrated polyoxytetramethylene glycol (OH value: 55, acid value: 1) and 12 g of 1,4-butanediol are kneaded using a three-roll mill, thereby obtaining a liquid kneaded material. Subsequently, the liquid kneaded material is heated at 90° C., and 4,4'-diphenylmethane diisocyanate is heated at 60° C. The both are continuously sent to a mixer at supply rates of 100 g/min for the liquid kneaded material and 20 g/min for the isocyanate compound, respectively by using respective gear pumps and quickly stirred. Thereafter, the resulting mixture is introduced into a twin-screw extruder and subjected to a polymerization kneading reaction under a condition at a screw rotation rate of 350 rpm and at 200° C., thereby producing a polyurethane resin (mother resin (2)).

A resin mother particle (4) having a volume average particle diameter of 7 μm is obtained in the same manner, except that in the preparation of the mother resin (1), the mother resin (1) (amorphous polyester resin) is replaced by the resulting mother resin (2).

A resin particle (13) is produced in the same manner as in Example 1, except that in the preparation of the resin particle (1), the resin mother particle (1) is replaced by the resin mother particle (4).

The resulting resin particle (13) is evaluated in the same manner as in the resin particle (1). The evaluation results are shown in Table 2.

Example 14

In a reaction vessel, 3.8 L of cyclohexane, 20 mL of tetrahydrofuran and 14 mol of a styrene monomer are charged, and 0.07 mol of n-butyllthium is further charged. Thereafter, the mixture is allowed to react at a reaction temperature of 50° C. for 5 minutes, thereby preparing a prepolymer solution. To this solution, 6 mol of a styrene monomer is added, and 0.02 mol of n-butyllithium is further thrown. The mixture is allowed to react at 80° C. for 10 minutes, and methanol is then added to this reaction solution to terminate the reaction. Subsequently, the solvent is distilled off under reduced pressure, and the residue is dried to produce a polystyrene resin (mother resin (3)).

A resin mother particle (5) having a volume average particle diameter of 7 μm is obtained in the same manner, except that in the preparation of the mother resin (1), the mother resin (1) (amorphous polyester resin) is replaced by the mother resin (3).

A resin particle (14) is produced in the same manner as in Example 1, except that in the preparation of the resin particle (1), the resin mother particle (1) is replaced by the resin mother particle (5).

The resulting resin particle (14) is evaluated in the same manner as in the resin particle (1). The evaluation results are shown in Table 2.

Examples 15 and 16

Resin particles (15) and (16) are produced in the same manner as in Example 1, except that in the preparation of the resin particle (1), the addition amount of the hydrophobic silica particle (1) relative to the resin mother particle (1) is changed in such a manner that the calculated coverage is an amount shown in the column of "Coverage [%]" of "Silica particle" of "Particle attaching step" in Table 1.

Each of the resulting resin particles (15) and (16) is evaluated in the same manner as in the resin particle (1). Th evaluation results are shown in Table 2.

TABLE 1

| | Preparing step Components to be added | | | | Particle forming step Total addition amount | | | Particle forming step Supply amount [g/min] | |
|---|---|---|---|---|---|---|---|---|---|
| | | | 10% Ammonia water | | | Ammonia water | | | |
| | Methanol Mass [g] | Water Mass [g] | Mass [g] | $NH_3$ amount [mol/L] | TMOS Mass [g] | Mass [g] | $NH_3$ concentration [%] | TMOS | Ammonia water |
| Ex. 1 | 600 | 0 | 100 | 0.68 | 450 | 270 | 4.44 | 15 | 9.0 |
| Ex. 2 | 600 | 0 | 90 | 0.62 | 450 | 270 | 4.44 | 15 | 9.0 |
| Ex. 3 | 600 | 0 | 100 | 0.68 | 240 | 120 | 4.44 | 8 | 4.0 |
| Ex. 4 | 600 | 0 | 128 | 0.85 | 450 | 360 | 4.44 | 15 | 11.7 |
| Ex. 5 | 650 | 0 | 100 | 0.64 | 400 | 105 | 4.44 | 15 | 4.0 |
| Ex. 6 | 400 | 0 | 80 | 0.80 | 200 | 200 | 4.44 | 4 | 4.0 |
| Ex. 7 | 600 | 0 | 100 | 0.68 | 150 | 100 | 4.00 | 6 | 4.0 |
| Ex. 8 | 600 | 0 | 100 | 0.68 | 560 | 160 | 4.44 | 7 | 2.0 |
| Ex. 9 | 600 | 0 | 87 | 0.60 | 540 | 144 | 4.44 | 15 | 4.0 |
| Ex. 10 | 200 | 0 | 30 | 0.62 | 180 | 90 | 4.00 | 2 | 1.0 |
| Ex. 11 | 600 | 0 | 100 | 0.68 | 450 | 270 | 4.44 | 15 | 9.0 |
| Ex. 12 | 600 | 0 | 100 | 0.68 | 450 | 270 | 4.44 | 15 | 9.0 |
| Ex. 13 | 600 | 0 | 100 | 0.68 | 450 | 270 | 4.44 | 15 | 9.0 |
| Ex. 14 | 600 | 0 | 100 | 0.68 | 450 | 270 | 4.44 | 15 | 9.0 |
| Ex. 15 | 600 | 0 | 100 | 0.68 | 450 | 270 | 4.44 | 15 | 9.0 |
| Ex. 16 | 600 | 0 | 100 | 0.68 | 450 | 270 | 4.44 | 15 | 9.0 |

| | Particle forming step Supply amount (relative amount) | | Particle forming step | | Particle attaching step Main resin | | | Particle attaching step Silica |
|---|---|---|---|---|---|---|---|---|
| | $NH_3$ amount [mole/min] (vs. TMOS) | TMOS amount [mole/(mole · min)] (vs. methanol) | Hydrophobilization Solids content of suspension [g] | Silica particles No. | Main body No. | Kind | Particle diameter [μm] | particles Calculated coverage [%] |
| Ex. 1 | 0.238 | 0.005 | 177.6 | 1 | 1 | Polyester | 7 | 50 |
| Ex. 2 | 0.238 | 0.005 | 177.6 | 2 | 1 | Polyester | 7 | 50 |
| Ex. 3 | 0.198 | 0.003 | 94.7 | 3 | 1 | Polyester | 7 | 50 |
| Ex. 4 | 0.317 | 0.005 | 177.6 | 4 | 1 | Polyester | 7 | 50 |
| Ex. 5 | 0.104 | 0.005 | 157.9 | 5 | 1 | Polyester | 7 | 50 |
| Ex. 6 | 0.397 | 0.002 | 78.9 | 6 | 1 | Polyester | 7 | 50 |
| Ex. 7 | 0.238 | 0.002 | 59.2 | 7 | 1 | Polyester | 7 | 50 |
| Ex. 8 | 0.113 | 0.002 | 221.0 | 8 | 1 | Polyester | 7 | 50 |
| Ex. 9 | 0.106 | 0.005 | 213.1 | 9 | 1 | Polyester | 7 | 50 |
| Ex. 10 | 0.179 | 0.002 | 71.0 | 10 | 1 | Polyester | 7 | 50 |
| Ex. 11 | 0.238 | 0.005 | 177.6 | 1 | 2 | Polyester | 2 | 50 |
| Ex. 12 | 0.238 | 0.005 | 177.6 | 1 | 3 | Polyester | 20 | 50 |
| Ex. 13 | 0.238 | 0.005 | 177.6 | 1 | 4 | Polyurethane | 7 | 50 |
| Ex. 14 | 0.238 | 0.005 | 177.6 | 1 | 5 | Polystyrene | 7 | 50 |
| Ex. 15 | 0.238 | 0.005 | 177.6 | 1 | 1 | Polyester | 7 | 20 |
| Ex. 16 | 0.238 | 0.005 | 177.6 | 1 | 1 | Polyester | 7 | 80 |

| | Preparing step Components to be added | | | | Particle forming step Total addition amount | | | Particle forming step Supply amount [g/min] | |
|---|---|---|---|---|---|---|---|---|---|
| | | | 10% Ammonia water | | | Ammonia water | | | |
| | Methanol Mass [g] | Water Mass [g] | Mass [g] | $NH_3$ amount [mole/L] | TMOS Mass [g] | Mass [g] | $NH_3$ concentration [%] | TMOS | Ammonia water |
| Comp. Ex. 1 | 600 | 0 | 100 | 0.68 | 600 | 60 | 4.00 | 20 | 2.0 |
| Comp. Ex. 2 | 600 | 100 | 200 | 1.11 | 450 | 270 | 4.44 | 15 | 9.0 |
| Comp. Ex. 3 | 600 | 0 | 100 | 0.68 | 600 | 90 | 4.00 | 20 | 3.0 |
| Comp. Ex. 4 | 600 | 0 | 70 | 0.50 | 450 | 120 | 4.44 | 15 | 4.0 |
| Comp. Ex. 5 | 600 | 0 | 120 | 0.80 | 450 | 350 | 7.30 | 15 | 11.7 |

TABLE 1-continued

| | | | | | | | | | |
|---|---|---|---|---|---|---|---|---|---|
| Comp. Ex. 6 | 500 | 0 | 75 | 0.62 | 250 | 200 | 4.44 | 2.5 | 2.0 |
| Comp. Ex. 7 | 430 | 0 | 80 | 0.75 | 450 | 150 | 4.00 | 15 | 5.0 |
| Comp. Ex. 8 | 200 | 0 | 30 | 0.62 | 180 | 90 | 4.00 | 2 | 1.0 |
| Comp. Ex. 9 | 200 | 0 | 30 | 0.62 | 290 | 100 | 4.00 | 5.8 | 2.0 |

| | Particle forming step | | | | Particle attaching step | | | |
|---|---|---|---|---|---|---|---|---|
| | Supply amount (relative amount) | | | | Main resin | | | Silica |
| | $NH_3$ amount [mole/min] (vs. TMOS) | TMOS amount [mole/(mole · min)] (vs. methanol) | Hydrophobilization Solids content of suspension [g] | Silica particles No. | Main body No. | Kind | Particle diameter [μm] | particles Calculated coverage [%] |
| Comp. Ex. 1 | 0.036 | 0.007 | 236.8 | 101 | 1 | Polyester | 7 | 50 |
| Comp. Ex. 2 | 0.238 | 0.005 | 177.6 | 102 | 1 | Polyester | 7 | 50 |
| Comp. Ex. 3 | 0.054 | 0.007 | 236.8 | 103 | 1 | Polyester | 7 | 50 |
| Comp. Ex. 4 | 0.106 | 0.005 | — | — | — | — | — | — |
| Comp. Ex. 5 | 0.508 | 0.005 | 177.6 | 105 | 1 | Polyester | 7 | 50 |
| Comp. Ex. 6 | 0.317 | 0.001 | 98.7 | 106 | 1 | Polyester | 7 | 50 |
| Comp. Ex. 7 | 0.119 | 0.007 | 177.6 | 107 | 1 | Polyester | 7 | 50 |
| Comp. Ex. 8 | 0.179 | 0.002 | 71.0 | 108 | 1 | Polyester | 7 | 50 |
| Comp. Ex. 9 | 0.123 | 0.006 | 114.5 | 109 | 1 | Polyester | 7 | 50 |

TABLE 2

| | Characteristic features of silica particles | | | | | | |
|---|---|---|---|---|---|---|---|
| | $D_{50v}$ [nm] | Particle size distribution | Average circularity [100/SF2] | Circularity distribution | Primary particles having an average circularity of 0.95 or more [% by number] | Hydrophilicity or hydrophobicity | Shape |
| Ex. 1 | 170 | 1.32 | 0.87 | 1.23 | 2.9 | Hydrophobic | Heterogeneous |
| Ex. 2 | 191 | 1.40 | 0.80 | 1.45 | 1.2 | Hydrophobic | Heterogeneous |
| Ex. 3 | 140 | 1.17 | 0.87 | 1.41 | 8.1 | Hydrophobic | Heterogeneous |
| Ex. 4 | 165 | 1.38 | 0.92 | 1.25 | 8.3 | Hydrophobic | Heterogeneous |
| Ex. 5 | 260 | 1.40 | 0.78 | 1.50 | 2.4 | Hydrophobic | Heterogeneous |
| Ex. 6 | 150 | 1.20 | 0.90 | 1.20 | 8.9 | Hydrophobic | Heterogeneous |
| Ex. 7 | 80 | 1.30 | 0.87 | 1.30 | 7.0 | Hydrophobic | Heterogeneous |
| Ex. 8 | 300 | 1.38 | 0.79 | 1.40 | 2.0 | Hydrophobic | Heterogeneous |
| Ex. 9 | 250 | 1.35 | 0.70 | 1.40 | 1.5 | Hydrophobic | Heterogeneous |
| Ex. 10 | 130 | 1.12 | 0.85 | 1.05 | 6.0 | Hydrophobic | Heterogeneous |
| Ex. 11 | 170 | 1.32 | 0.87 | 1.23 | 2.9 | Hydrophobic | Heterogeneous |
| Ex. 12 | 170 | 1.32 | 0.87 | 1.23 | 2.9 | Hydrophobic | Heterogeneous |
| Ex. 13 | 170 | 1.32 | 0.87 | 1.23 | 2.9 | Hydrophobic | Heterogeneous |
| Ex. 14 | 170 | 1.32 | 0.87 | 1.23 | 2.9 | Hydrophobic | Heterogeneous |
| Ex. 15 | 170 | 1.32 | 0.87 | 1.23 | 2.9 | Hydrophobic | Heterogeneous |
| Ex. 16 | 170 | 1.32 | 0.87 | 1.23 | 2.9 | Hydrophobic | Heterogeneous |

| | | | Characteristics of resin particle | | | | |
|---|---|---|---|---|---|---|---|
| | | Resin mother | | Dispersibiiity of silica particles | | | |
| | Silica particles No. | particle No. | No. | Before applying mechanical load | After applying mechanical load | Fluidity | Aggregation properties |
| Ex. 1 | 1 | 1 | 1 | A | A | A | A |
| Ex. 2 | 2 | 1 | 2 | A | A | A | A |
| Ex. 3 | 3 | 1 | 3 | A | A | A | A |
| Ex. 4 | 4 | 1 | 4 | A | A | A | A |
| Ex. 5 | 5 | 1 | 5 | B | B | B | A |
| Ex. 6 | 6 | 1 | 6 | A | A | A | A |
| Ex. 7 | 7 | 1 | 7 | A | A | A | A |
| Ex. 8 | 8 | 1 | 8 | A | B | B | A |

TABLE 2-continued

| | | | | | | | |
|---|---|---|---|---|---|---|---|
| Ex. 9 | 9 | 1 | 9 | A | B | B | A |
| Ex. 10 | 10 | 1 | 10 | A | A | A | A |
| Ex. 11 | 1 | 2 | 11 | A | A | B | A |
| Ex. 12 | 1 | 3 | 12 | A | B | A | A |
| Ex. 13 | 1 | 4 | 13 | A | A | A | A |
| Ex. 14 | 1 | 5 | 14 | A | A | A | A |
| Ex. 15 | 1 | 5 | 15 | A | A | A | A |
| Ex. 16 | 1 | 7 | 16 | A | A | A | A |

| | Characteristic features of silica particles | | | | | | |
|---|---|---|---|---|---|---|---|
| | $D_{50v}$ [nm] | Particle size distribution | Average circularity [100/SF2] | Circularity distribution | Primary particles having an average circularity of 0.95 or more [% by number] | Hydrophilicity or hydrophobicity | Shape |
| Comp. Ex. 1 | 500 | 1.91 | 0.80 | 1.95 | 2.0 | Hydrophobic | Heterogeneous |
| Comp. Ex. 2 | 219 | 1.18 | 0.94 | 1.11 | 25.0 | Hydrophobic | Spherical |
| Comp. Ex. 3 | 163 | 1.31 | 0.85 | 1.82 | 2.2 | Hydrophilic | Heterogeneous |
| Comp. Ex. 4 | Gelled | — | — | — | — | — | — |
| Comp. Ex. 5 | 150 | 1.12 | 0.97 | 1.03 | 85.0 | Hydrophobic | Spherical |
| Comp. Ex. 6 | 140 | 1.12 | 0.97 | 1.20 | 80.0 | Hydrophobic | Spherical |
| Comp. Ex. 7 | 320 | 1.48 | 0.92 | 1.40 | 75.0 | Hydrophobic | Spherical |
| Comp. Ex. 8 | 70 | 1.23 | 0.88 | 1.30 | 25.0 | Hydrophobic | Heterogeneous |
| Comp. Ex. 9 | 130 | 1.50 | 0.80 | 1.60 | 5.0 | Hydrophobic | Heterogeneous |

| | | | Characteristics of resin particles | | | | |
|---|---|---|---|---|---|---|---|
| | | | | Dispersibility of silica particle | | | |
| | Silica particles No. | Resin mother particle No. | No. | Before applying mechanical load | After applying mechanical load | Fluidity | Aggregation properties |
| Comp. Ex. 1 | 101 | 1 | 101 | C | C | C | C |
| Comp. Ex. 2 | 102 | 1 | 102 | A | A | C | C |
| Comp. Ex. 3 | 103 | 1 | 103 | B | C | B | B |
| Comp. Ex. 4 | — | — | — | — | — | — | — |
| Comp. Ex. 5 | 105 | 1 | 105 | B | C | C | B |
| Comp. Ex. 6 | 106 | 1 | 106 | B | C | C | B |
| Comp. Ex. 7 | 107 | 1 | 107 | C | C | C | C |
| Comp. Ex. 8 | 108 | 1 | 108 | A | A | C | C |
| Comp. Ex. 9 | 109 | 1 | 109 | C | C | C | C |

As is noted from Table 2, similar to the resin particle (1), in all of the resin particles (2) to (16), the aggregation is suppressed. Also, the resin particles (1) to (16) are excellent in the fluidity. It may be considered that this is caused due to the fact that the dispersibility of the silica particles on the surface of the resin mother particle is excellent even after producing the resin particle and also even after giving a mechanical load to the resin particle.

In Comparative Example 4, the dispersion liquid is gelled during the silica particle forming step, so that no silica particle is obtained. For that reason, the symbol "–" is marked in each of the columns of "Characteristic features of silica particle" and "Characteristics of resin particle" in Table 2.

While the present invention has been shown and described with reference to certain exemplary embodiments thereof, it will be understood by those skilled in the art that various changes modifications may be made therein without departing from the spirit and scope of the present invention as defined by the appended claims.

What is claimed is:

1. A resin particle, comprising:

a resin mother particle; and a silica particles externally added onto a surface of the resin mother particle, wherein primary particles of the silica particles have a volume average particle diameter of from 80 nm to 300 nm, a particle size distribution index of from 1.10 to 1.40, an average circularity of from 0.70 to 0.92 and an average circularity distribution index of from 1.05 to 1.50, and a proportion of the primary particles having an average circularity of 0.95 or more is not more 10% by number, wherein the particle size distribution index ($GSD_v$) is $(D_{84v}/D_{16v})^{0.5}$, where $D_{84v}$ is a particle diameter at an accumulation of 84% and $D_{16v}$ is a particle diameter at an accumulation of 16%, and the average circularity distribution index is a square root of a value obtained by dividing 84% circularity by 16% circularity in cumulative frequency.

2. The resin particle according to claim 1, wherein a surface of the silica particles are subjected to a hydrophobic treatment.

3. The resin particle according to claim 1, wherein the volume average particle diameter of the primary particles of the silica particles is from 90 nm to 250 nm.

4. The resin particle according to claim 1, wherein the volume average particle diameter of the primary particles of the silica particles is from 100 nm to 200 nm.

5. The resin particle according to claim 1, wherein the particle size distribution index of the primary particles of the silica particles is from 1.10 to 1.25.

6. The resin particle according to claim 1, wherein the average circularity of the primary particles of the silica particles is from 0.72 to 0.85.

7. The resin particle according to claim 1, wherein the proportion of the primary particles having an average circularity of 0.95 or more is not more 8% by number.

8. The resin particle according to claim 1, wherein a coverage of the silica particles externally added onto the surface of the resin particle relative to a surface area of the resin mother particle is obtained by the following formula (i), is 5% to 80%:

$$(\sqrt{3}\times A\times b\times R)/(0.001\times 2\pi\times a\times B\times r)\times 100 \quad \text{(i)}$$

wherein

A whose unit is $g/cm^3$ represents a specific gravity of the resin mother particle, R whose unit is "μm" represents a particle diameter of the resin particle, B whose unit is "g" represents a charge amount of the resin particle, a whose unit is "$g/cm^3$" represents a specific gravity of the specified silica particles, r whose unit is "nm" represents a particle diameter of the specified silica particles, and b whose unit is "g" represents a charge amount of the specified silica particles.

9. A method for preparing the resin particle of claim 1, comprising:

preparing an alkaline catalyst solution containing an alkaline catalyst in a concentration of from 0.6 mol/L to 0.85 mol/L in a solvent containing alcohol;

supplying a tetraalkoxysilane in a supply amount of 0.002 mol/(mol·min) or more and less than 0.006 mol/(mol·min) relative to the alcohol into the alkaline catalyst solution and also supplying an alkaline catalyst in an amount of from 0.1 mol to 0.4 mol per mole of a total supply amount of the tetraalkoxysilane to be supplied per minute to obtain silica particles; and allowing the obtained silica particles to be externally added onto the surface of a resin mother particle.

10. The method for preparing the resin particle according to claim 9, wherein the alkaline catalyst is selected from the group consisting of an ammonia, an urea, a monoamine, and a quaternary ammonium salt.

11. The method for preparing the resin particle according to claim 9, wherein a content of the alkaline catalyst is from 0.63 mol/L to 0.78 mol/L.

12. The method for preparing the resin particle according to claim 9, wherein the tetraalkoxysilane is selected from the group consisting of a tetramethoxysilane, a tetraethoxysilane, a tetrapropoxysilane and a tetrabutoxysilane.

13. The method for preparing the resin particle according to claim 9, wherein the supply amount of the tetraalkoxysilane is from 0.0020 mol/(mol·in) to 0.0046 mol/(mol·min) relative to the alcohol in the alkaline catalyst solution.

14. The method for preparing the resin particle according to claim 9, wherein the supply amount of the tetraalkoxysilane is from 0.0020 mol/(mol·min) to 0.0033 mol/(mol·min) relative to the alcohol in the alkaline catalyst solution.

15. The method for preparing the resin particle according to claim 9, wherein a temperature in the alkaline catalyst solution at supplying the tetraalkoxysilane is from 5° C. to 50° C.

16. The method for preparing the resin particle according to claim 9, further comprising:

treating a surface of the silica particles with a hydrophobic treatment agent.

* * * * *